Jan. 2, 1923.
T. FRENZEL.
MANUFACTURE OF KNOTTED FABRICS.
FILED NOV. 25, 1921.
1,440,779
5 SHEETS-SHEET 1
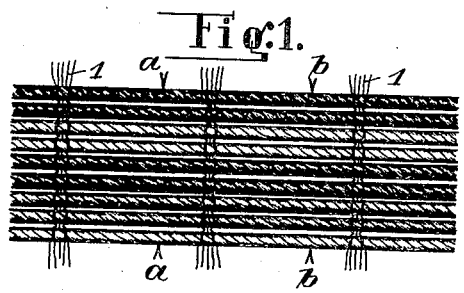
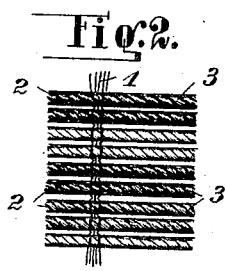
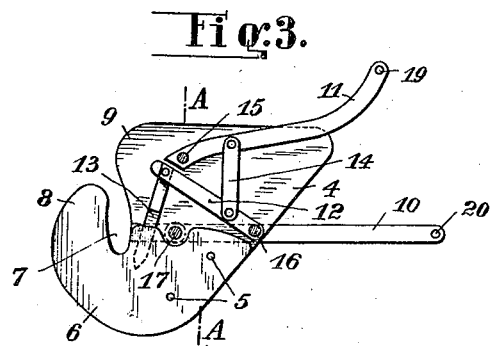
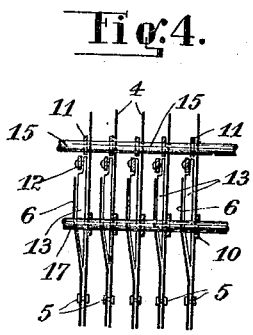
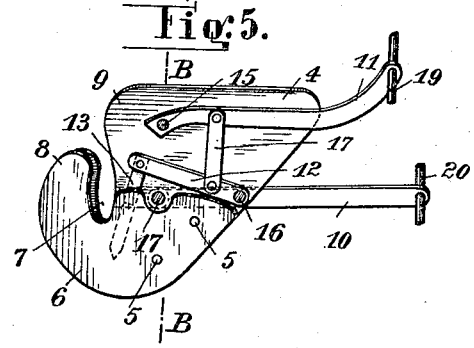
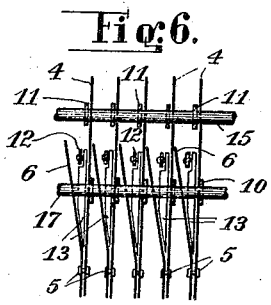
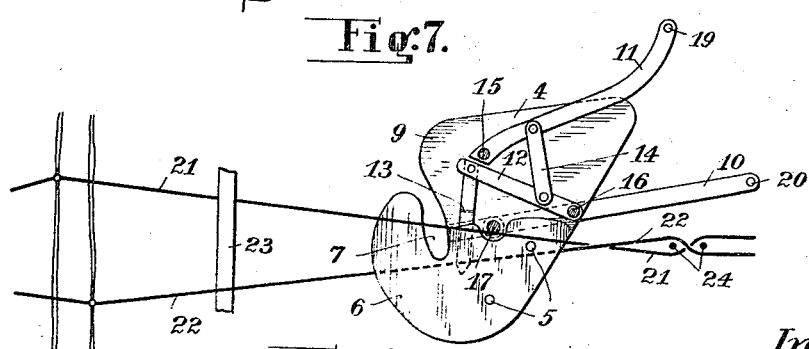
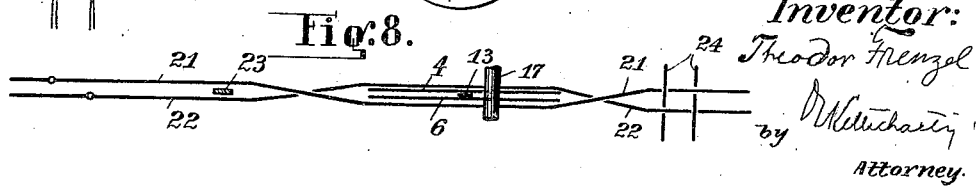
*Inventor:*
Theodor Frenzel
by
*Attorney.*

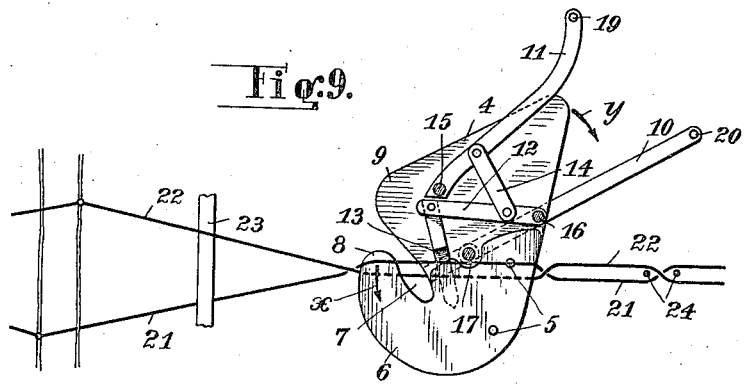
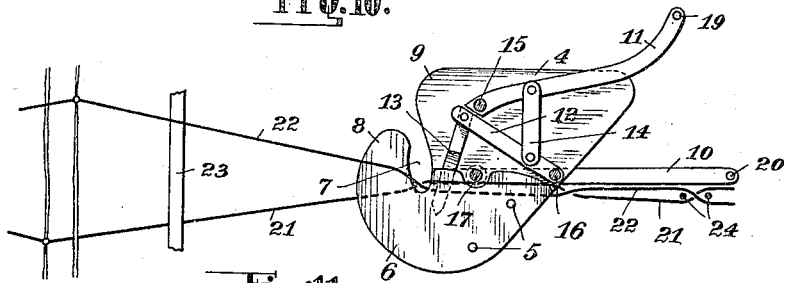
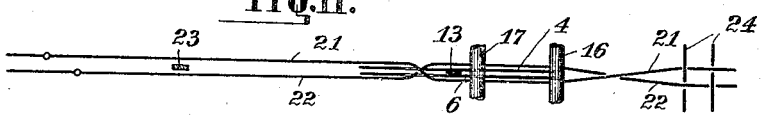
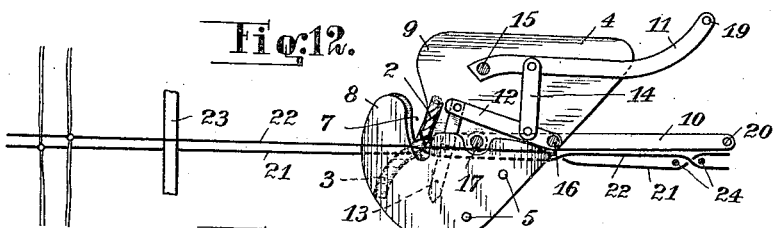
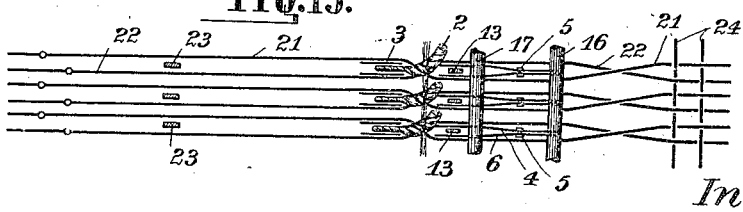

Jan. 2, 1923. 1,440,779
T. FRENZEL.
MANUFACTURE OF KNOTTED FABRICS.
FILED NOV. 25, 1921. 5 SHEETS-SHEET 3
Fig.14.
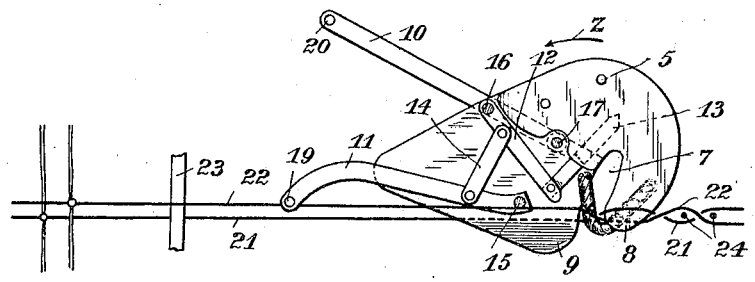
Fig.15.
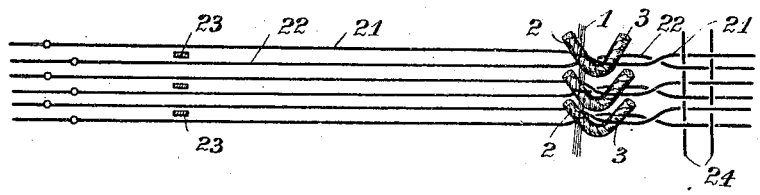
Fig.16. Fig.17. Fig.18.
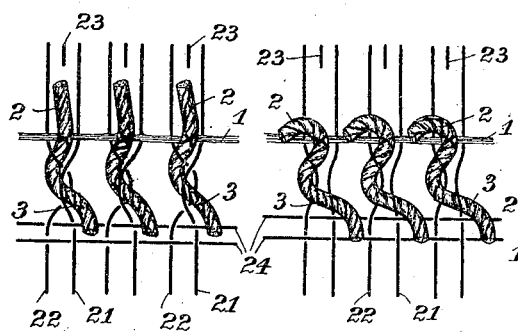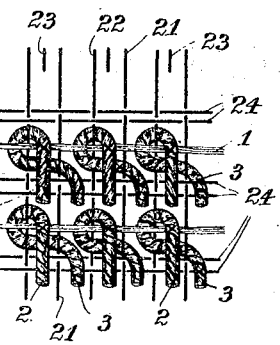
Fig.19.
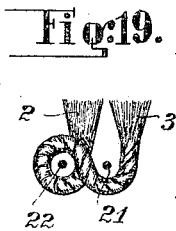
Inventor
Theodor Frenzel
by O. Kleinhaus
Attorney

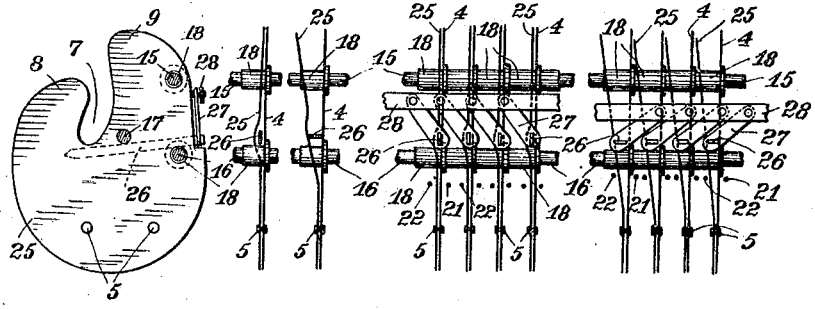
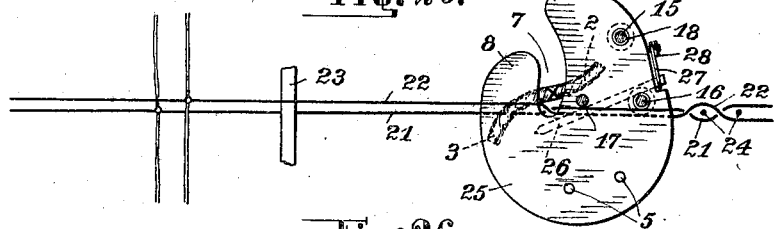
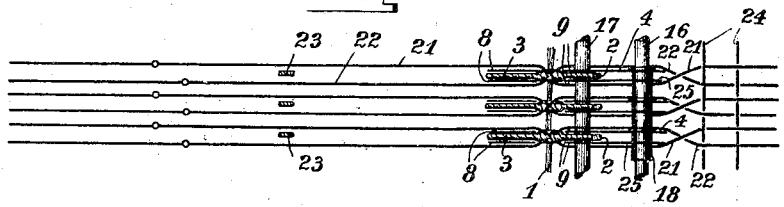
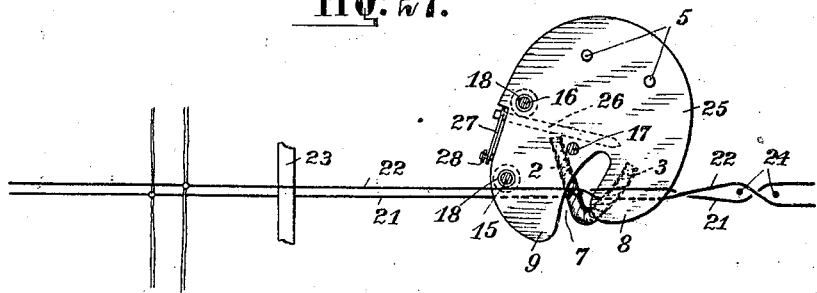

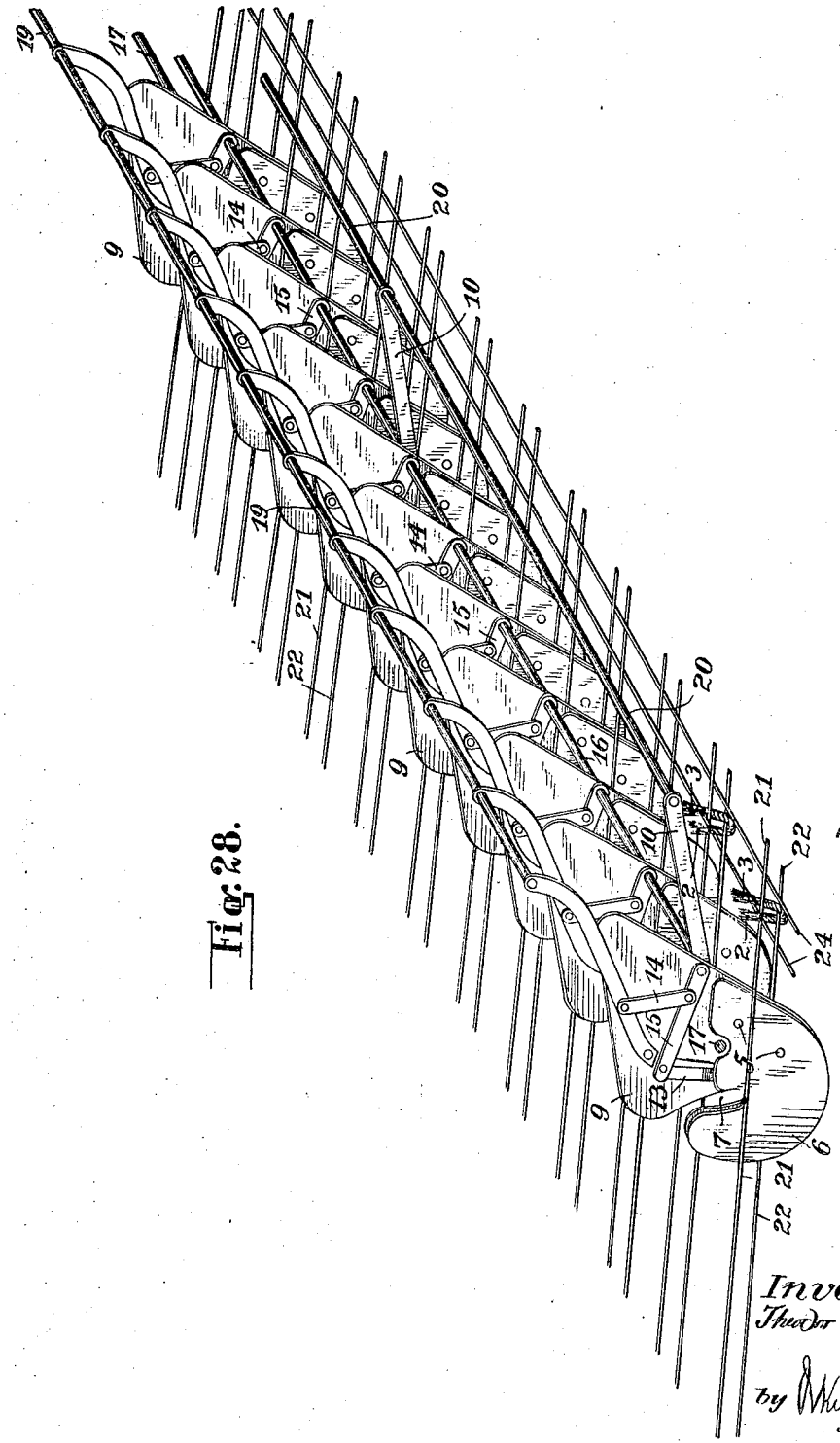

Patented Jan. 2, 1923.

1,440,779

UNITED STATES PATENT OFFICE.

THEODOR FRENZEL, OF BERLIN, GERMANY.

MANUFACTURE OF KNOTTED FABRICS.

Application filed November 25, 1921. Serial No. 517,757.

*To all whom it may concern:*

Be it known that I, THEODOR FRENZEL, a German citizen, residing at Berlin, Germany, have invented certain new and useful Improvements in the Manufacture of Knotted Fabrics (for which I have filed applications in Germany May 20, 1920, April 9, 1921; France, May 19, 1921, England, May 19, 1921; Czecho-Slovakia, May 20, 1921), of which the following is a specification.

My invention refers to the manufacture of knotted fabrics and more especially carpets and its particular object is to facilitate the manufacture by mechanical means, of carpets of the oriental type (Persian carpets) possessing all characteristics of the genuine hand made products.

Devices for manufacturing knotted fabrics such as the carpets spoken of mechanically in order to save time, have already been proposed.

Manufacture by aid of such devices is, however, mostly very expensive and is also, to some extent, attended with difficulties in connection with the intertwining of the pile threads round the warp thread of the foundation cloth.

It is an object of the present invention to overcome these difficulties. The new method of producing knotted fabrics, such as carpets substantially consists in preparing the fur pick by the weaving of an ordinary chenille piece with differently coloured wefts to suit the colours of the carpet to be produced, which may be of any desired size, this being done in exactly the same way as in the manufacture of patent Axminster carpets. According to the length of tufts desired, the chenille piece is produced for a greater or lesser number of carpets at a time. The weft threads of the chenille piece are cut parallel to the warp into strips having the pile threads connected by the warp, and these chenille strips are then inserted in the warp of the foundation structure by knotting each pile thread individually and all the pile threads simultaneously, the chenille strip being placed across the warp of the foundation structure and the pile threads being then tied, by knotting, to the warp threads of the foundation structure.

In contradistinction to the method followed in the manufacture of chenille or patent Axminster carpets, wherein the strips as a whole are interwoven with the foundation structure, I cause the pile threads forming part of each strip to be knotted all at a time into the warp of the foundation structure, the knots formed being true Persian knots and the warp threads of the strips being removed afterwards, if desired.

In order that the two ends of the knotted tuft of pile be of equal length, in cutting the chenille piece into strips I provide that the ends projecting from one and the other side of the warp threads in the strip are unequal in length, one end of each pile thread being about double as long as the other.

The substantial advantage of the invention consists in that, by using a chenille piece, a closely woven knotted fabric of oriental type, can be produced on carpet looms of any width with a great saving of time, since finished chenille of any desired pattern can be knotted into the foundation structure, in one operation, whereas, in hand knotted fabrics, each knot has to be tied separately.

In illustration of the novel method, the accompanying drawing shows, by way of example, two embodiments of a device adapted for carrying out the method and which forms part of the present invention. In the drawings—

Fig. 1 shows a portion of the chenille piece, and

Fig. 2 a chenille strip cut therefrom.

Fig. 3 is a side elevation of one of the row of knotting jaws employed in inserting the pile threads assembled in the chenille strip in the ground weave.

Fig. 4 is a front elevation of a number of such jaws in inoperative position.

Fig. 5 is a view similar to Fig. 3 of a knotting jaw in its first operative condition, and Fig. 6 shows the row of jaws, disclosed in Fig. 4, in the same working position.

Fig. 7 is a side elevation illustrating the first step, viz the insertion of the row of knotting jaws, in the ground warp of a carpet loom.

Fig. 8 is the corresponding plan view,

Figs. 9, 10, 12 and 14 are side elevations, and

Figs. 11 and 13 plan views showing the knotting jaw or jaws and the fabric in different stages of operation.

Fig. 15 is a plan view showing the position of the pile thread after the withdrawal of the knotting jaws.

Figs. 16 to 18 illustrate the three final stages of the knotting operation, and

Fig. 19 is a front elevation of a knotted pile thread.

Figs. 20 to 27 disclose another modification of the knotting device,

Fig. 20 being a side elevation and

Figs. 21 to 24 front elevations.

Figs. 25 and 27 are side elevations and

Fig. 26 a plan view corresponding to Fig. 25, illustrating the operation of the device.

Figure 28 is a perspective view of part of my novel device placed in position so as to extend across and be inserted in the ground warp of the carpet loom.

Referring first to Figs. 1 to 19 of the drawings, the chenille piece is produced in a well known manner, the material intended for the tufts of pile being woven as weft into warp threads 1 arranged in groups at definite intervals (Fig. 1).

On the weft threads being cut at $a$ and $b$ (Fig. 1) chenille strips such as shown in Fig. 2 are formed, consisting of the warp threads 1 and the projecting ends 2 and 3 of the pile threads.

These chenille strips are now laid, as weft, across the ground warp of a carpet loom, and the pile threads are bound into said warp, in the form of Persian knots, by means of a special knotting device.

According to Figs. 3 and 4 this knotting device consists of jaws 4 and 6 connected together, jaw 6 being secured to the lower part of jaw 4 by means of rivets 5. Tongues 8 and 9 are formed in both jaws by the indenture 7. To the jaw 4 is attached a rod 10. At the upper end of the jaw 4 a lever 14 is pivoted on a rod 15, and on a level with the arm 10 a lever 12 is pivoted on a rod 16 and has pivotally attached to it a wedge-shaped member 13, the free end of which extends between the jaws 4 and 6. The levers 11 and 12 are connected by means of the link 14. When lever 11 is depressed, the wedge 13 enters between the jaws 4 and 6 and forces them apart (Figs. 5 and 6).

A suitable number of these pairs of jaws are arranged, side by side, across the width of the piece of fabric to be produced. The jaws 4 are mounted on rods 15 and 16 of corresponding length, a third rod 17 being provided as a guide. The distance between the successive pairs of jaws corresponds to the bars of the reed and the jaws are maintained at the desired intervals by means of spacing rings 18 slipped on to the shafts (Figs. 21 to 24). For the sake of clearness, these spacing rings are omitted in Figs. 4 and 6.

The combined guide rods and knotting jaws form a comb corresponding to the reed.

The ends of the levers 11 and 10 are connected by rods 19 and 20, respectively, so that the levers can be moved conjointly.

The device can be used in the ordinary carpet looms.

In Figs. 7, 21 and 22 represent two ground warp threads, which have been raised and lowered respectively, in a well known manner, to form a shed. 23 is one of the dents or rods of the reed. The raised warp thread 21 lies behind this rod, and the lowered warp thread 22 in front of same. 24, 24 are the ground weft threads last inserted.

The knotting device comprising the jaws described is placed by hand on the warp and in front of the reed in such a way that the jaws enter between the raised warp threads without however being lowered below the level of the lowered warp threads 22. Hereupon the set of jaws is first moved by hand sideways (in the direction towards the observer) and then lowered (Fig. 7). The warp threads 21 still lies in front of the jaw, but the warp threads 22 now lies behind it, so that a crossing of the warp threads has been effected in front of and behind the pair of jaws (Fig. 8).

If now the warp threads 22 be raised and the threads 21 lowered, these warp threads come together in front of the tongue 8 at a point where they cross (Fig. 10) in front of the jaws.

If now the jaw be rotated by hand, from right to left, until the tongue 8 leaves the threads, and the reed be shifted near the jaw, the tension on the threads 21, 22 will cause the crossing of the threads to move close to the tongue 9. If now the jaws be again turned by hand to the right so that the tongue 8 rises, it will enter between the crossed threads 21, 22 in front of the crossing which will then lie within the recess 7 (Fig. 10).

The set of jaws with the two shafts 16 and 17 is now turned by hand in the direction of arrow $y$ (Fig. 9) and rests on the ground warp, and is supported on the fell of the fabric by means of the bar 20 connecting the rods 10.

By applying pressure to the lever 11, the lever 12 and the wedge member 13 resting thereon are moved downwards by means of the intermediate member 14, thus forcing the jaws 5 and 6 apart.

The preliminary chenille fabric is now laid on the crossed warp threads in the recesses 7, and the longer ends 3 of the pile thread are inserted between the ends of the tongue 8 of the jaws 4 and 6 (Figs. 12 and 13).

The lever 11 is thereupon raised again, thus allowing the jaw 6 to apply itself against jaw 4, so that the ends 3 of the chenille pile threads are gripped between the tongues 8 forming part of the jaws.

The set of jaws is now turned through 180 degrees in the direction of the arrow $z$ (Fig. 14) in consequence of which the ends 3 of the pile threads are drawn downwards round the crossing of the threads in the recess 7, and upwards again between the warp ends.

In the position shown in Fig. 14 the jaws lie with their shaft 15 on the warp, and are also supported by the connecting rod 19 of the levers 11. By applying pressure on the guide arm 12, the clamping jaws are again forced apart, and release the ends 3 of the pile threads, which are now pushed against the ground weft 24 by the noses 9 of the jaws.

The loose ends 2 of the pile threads are held in any upright position above the ground warps by means of the warp threads 1 of the chenille strip (Fig. 15).

By beating up the bars, rods or dents 23 of the reed, after withdrawing the set of clamping jaws, the ground warp threads 21, 22 which are held in the crossed position by the set of jaws, are returned to their original position.

Fig. 16 shows the crossed position of the warp threads whilst in Fig. 17 they have already returned into the stretched position, whereby, after the beat of the reed, the crossed pile thread ends are brought into the position shown in Fig. 18, with the true oriental knotting, as shown in frontal elevation in Fig. 21.

After the insertion of the ground weft 24, the described cycle of operations is repeated for the next row of weft.

After the knotting is completed, the core or warp thread 1 of the chenille can be drawn out of the fabric.

In the modification illustrated in Figs. 20 to 24 each jaw 4 has another jaw of identical configuration fixed to it by means of rivets 5. The pairs of jaws are also arranged side by side on rods or shafts 15, 16, 17, spacers 18 being inserted intermediate each two pairs. Between the jaws 4 and 25 of each pair there is inserted a flat rod 26 carrying at its outer end a lever arm 27 which on being turned causes the rod 26 to force the jaws 4 and 25 apart (Fig. 22). The ends of the arms 27 are connected by a transverse bar 28 allowing to turn them simultaneously.

With this modification the working process is the same as described above, except that in this case both ends 2 and 3 of the pile threads are gripped by the tongues 8 and 9 (Fig. 25). The opening and closing of the tongues is effected by displacing the bar 28 laterally (Fig. 24).

I wish it to be understood that I do not desire to be limited to the exact mode of proceeding nor to the exact details of construction shown and described, for obvious modifications will occur to a person skilled in the art.

I claim:

1. The method of manufacturing knotted fabric, more particularly Persian carpets which comprises placing a plurality of pile threads united to form a chenille strip, across the warp of a foundation structure and causing said pile threads to be tied, all at a time, by knotting to said warp threads.

2. The method of manufacturing knotted fabric, more particularly Persian carpets which comprises placing a plurality of pile threads united to form a chenille strip, across the warp of a foundation structure and causing each pile thread individually and all said threads simultaneously to be tied by knotting to said warp threads.

3. The method of manufacturing knotted fabric, more particularly Persian carpets, which comprises preparing the fur pick by weaving in the form of a chenille piece such as used in making patent Axminster carpets, cutting such piece into strips in such manner that the ends of the pile threads are longer on one side of the strip than on the other, placing such strips one after the other across the warp of a foundation structure and causing each pile thread individually and all said threads simultaneously to be tied by knotting to said warp threads.

4. The method of manufacturing knotted fabric, more particularly Persian carpets consisting in intercrossing the warp threads of a foundation structure in the plane of said structure holding the crossings of the warp threads apart, placing a plurality of pile threads united to form a chenille strip across the intercrossed warp threads, causing each pile thread individually and all said pile threads at a time to be twisted around said crossed warp threads so that the ends of said pile threads are turned upwards again, and causing said pile threads to be pressed against the finished web and to be released again together with the crossings, whereby, after the warp threads of the foundation structure have returned into their original positions, the knotting of the pile threads is completed.

5. In a device of the kind described in combination, a row of juxtaposed pairs of coacting clamping jaws, a rod uniting all said pairs of jaws and means for simultaneously spreading apart and closing, respectively, the jaws in all said pairs.

6. In a device of the kind described in combination, a row of juxtaposed pairs of coacting clamping jaws, each jaw being provided with an indenture, a rod uniting all said pairs of jaws, means for simultaneously spreading apart and closing respectively, the jaws in all said pairs, and means for turning said row of jaws about an axis extending through the indenture.

7. In a device of the kind described in combination, a rod, a row of juxtaposed pairs of coacting clamping jaws on said rod, two tongues being formed on said jaws by an indenture and means for simultaneously spreading the jaws of all said pairs apart.

8. In a device of the kind described in combination a rod, a row of juxtaposed pairs of coacting clamping jaws on said rod, a wedge inserted between the jaws of each pair and means for moving the wedges of all the pairs of jaws simultaneously.

9. In a device of the kind described in combination, a rod, a row of juxtaposed pairs of coacting clamping jaws on said rod, a wedge inserted between the jaws of each pair, a lever connected with said wedge and a manipulating rod connecting all said levers.

10. In a device of the kind described in combination, a plurality of parallel rods, a row of juxtaposed pairs of coacting clamping jaws arranged on and traversed by said rods, two tongues being formed on said jaws by an indenture, a bar fixed to one jaw of each pair, a rod connecting the bars of all said jaws, a wedge inserted between the jaws of each pair, a lever connected with said wedge and a manipulating rod connecting all said levers.

In testimony whereof I affix my signature.

THEODOR FRENZEL.